July 4, 1939.  E. L. BARRETT  2,164,633
ELECTRIC MOTOR
Filed Oct. 15, 1937   2 Sheets-Sheet 1
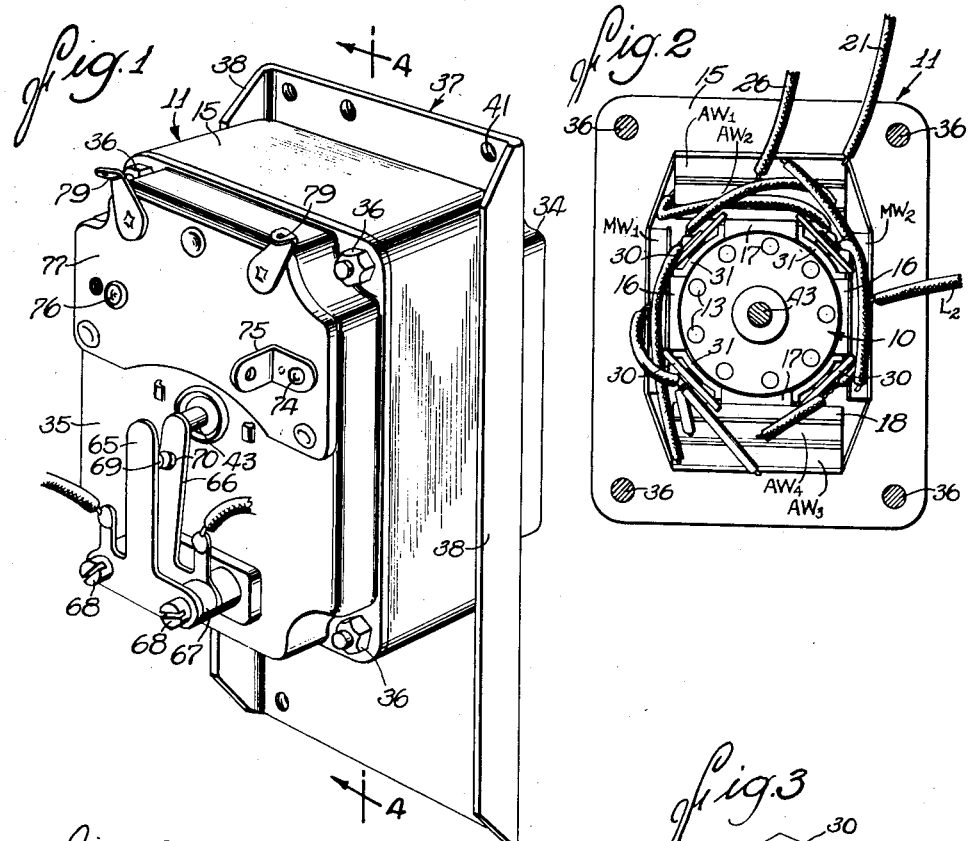
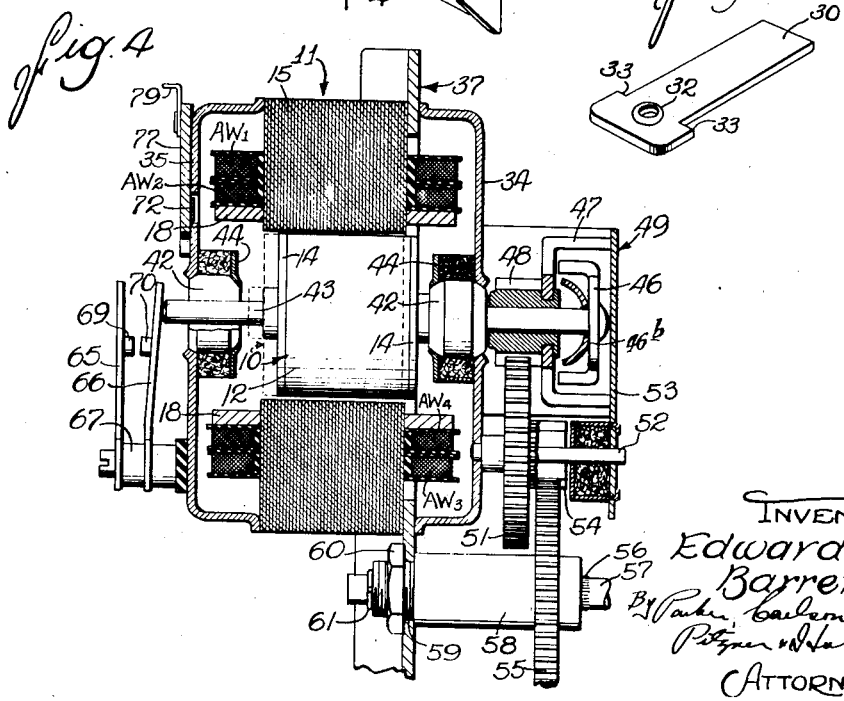
INVENTOR
Edward L. Barrett
By Parker, Carlson, Pitzner & Hubbard
ATTORNEYS July 4, 1939.  E. L. BARRETT  2,164,633
ELECTRIC MOTOR
Filed Oct. 15, 1937  2 Sheets-Sheet 2
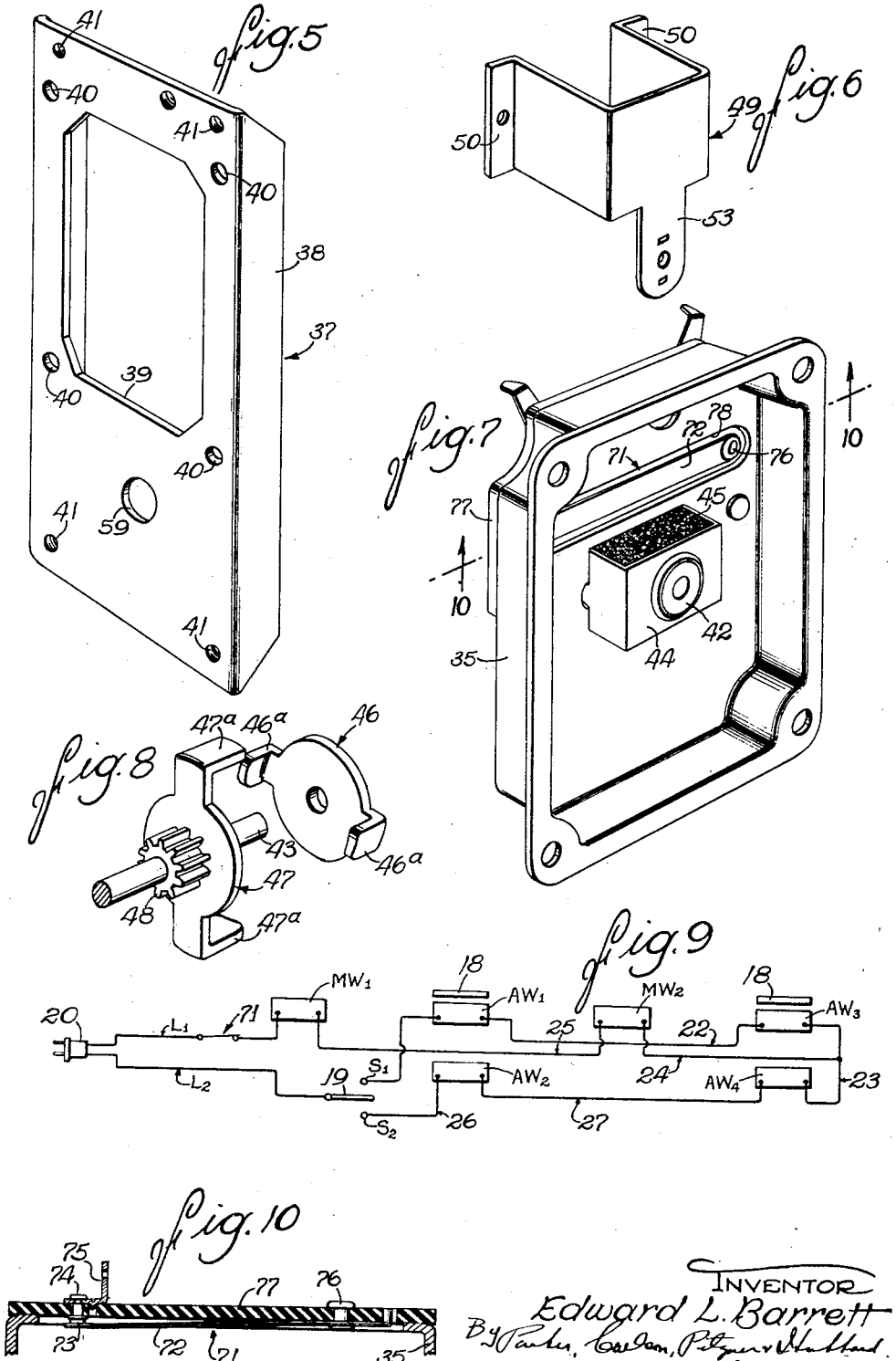

Patented July 4, 1939

2,164,633

UNITED STATES PATENT OFFICE 2,164,633

ELECTRIC MOTOR

Edward L. Barrett, La Grange, Ill., assignor to Utah Radio Products Company, Chicago, Ill., a corporation of Illinois Application October 15, 1937, Serial No. 169,095

13 Claims. (Cl. 172—36)

The invention relates to electric motors and more particularly to small electric motors used to operate such instrumentalities as, for example, the tuning mechanisms of radio receiving sets.

One object of the present invention is to provide such a motor embodying an improved form of combined clutch and brake mechanism by means of which the driven member of the clutch is not only automatically disengaged but is also positively stopped in response to deenergization of the motor.

Another object of the invention is to provide in a motor of the type set forth, and having a rotor movable axially into and out of operative relation with the stator and which is effective to control an associated clutch mechanism, an improved form of associated switching mechanism adapted to urge the rotor to a predetermined axial position and which is readily accessible for assembly and repair as well as quiet and effective in operation.

Another object of the invention is to provide in a motor having a plurality of insertable stator exciting windings an improved form of wedge construction for holding the coils in place and for also supporting the end connections therebetween.

Still another object of the invention is to provide in a motor of the type set forth a novel stator assembly of such character that the laminated stator core together with its associated windings may be detached as a unit from the associated end shields of the motor without danger of disarrangement of the parts of such unit.

A further object of the invention is to provide in a motor of the type set forth a simplified but sensitive thermal safety switch construction.

The invention also resides in the improved mounting construction for the motor.

Further objects and advantages of the invention will become apparent as the following description proceeds and the features of novelty which characterize the invention are pointed out with particularity in the claims annexed to and forming a part of this specification.

For a better understanding of the invention reference may be had to the accompanying drawings in which Figure 1 is a perspective rear view of an electric motor embodying the invention.

Fig. 2 is a front end elevation of the motor shown in Fig. 1, with the adjacent end shield and associated parts removed.

Fig. 3 is a detail perspective view of one of the coil mounting wedges included in the motor of Fig. 1.

Fig. 4 is a vertical section along the line 4—4 in Fig. 1.

Fig. 5 is a detail perspective view of the mounting plate included in the motor of Fig. 1.

Figs. 6 and 7 are respectively detail perspective views of the clutch enclosing bracket and the rear end shield of the motor.

Fig. 8 is an exploded perspective view of the parts of the clutch mechanism included in the motor.

Fig. 9 is a schematic wiring diagram of the motor.

Fig. 10 is a transverse sectional view along the line 10—10 in Fig. 7.

For purposes of illustration the invention has been shown and described herein as embodied in a reversible alternating current induction motor of the shaded pole type. It will be apparent to those skilled in the art, however, that the invention is applicable in many of its aspects to a variety of other types of motors which may be either unidirectional or reversible in operation and energized with either direct or alternating current. The particular motor illustrated includes as its principal elements relatively rotatable primary and secondary members shown in the form of a rotor 10 (Fig. 2) and a stator unit designated generally by the numeral 11. This motor is adapted to operate such instrumentalities as radio tuning mechanisms, toys, valves, and the like, and is in general so constructed that the rotor may be readily started, stopped, or reversed by a simple switch mechanism located either adjacent the motor or at a remote point.

The rotor or armature 10 is of the induction type and includes a generally cylindrical magnetizable core 12 (Fig. 4) disposed within a rotor recess in the stator. A squirrel cage winding on the rotor is formed by a plurality of generally axially extending but skewed rotor bars or conductors 13 (Fig. 2) short-circuited at their opposite ends by copper disks 14.

The stator unit 11 includes a flat substantially rectangular core 15 made up of laminations of suitably magnetizable sheet steel or iron. Upon reference to Fig. 2, it will be seen that the core is provided with a centrally located rotor recess in which the rotor 10 is disposed, this recess being bordered by a plurality of inwardly extending integral pole pieces or projections 16 and 17. The pole pieces 17 are preferably somewhat longer than the pole pieces 16 in order to accommodate the greater number of energizing windings mounted thereon for a purpose hereinafter explained.

In order to reduce their cost of manufacture the energizing windings are preferably made in the form of flat preformed coils which are slipped over the pole pieces. For this purpose, the sides of the pole pieces are preferably parallel so as to permit ready insertion of the windings. In the particular construction shown, the pole pieces 17 are shaded by suitable shading rings shown in the form of heavy copper rings 18 encircling the outer ends of the pole pieces. The unshaded pole pieces 16 are energized by main energizing windings $MW_1$ and $MW_2$ while each of the shaded pole pieces 17 is provided with two alternatively available auxiliary energizing windings $AW_1$—$AW_2$ and $AW_3$—$AW_4$, respectively. In order that they may effect a magnetization of opposite polarity the auxiliary windings $AW_1$ and $AW_2$ are oppositely wound with respect to each other as are the windings $AW_3$ and $AW_4$. It will be understood that by the term "oppositely wound" reference is had to any arrangement in which the windings serve to produce a magnetic flux of opposite instantaneous polarity; that is, the coils may be actually wound in opposite directions about the pole pieces or the windings may be in the same direction but the end connections reversed, the net effect being the same in either case.

With such an arrangement of windings the pole pieces may be selectively energized to form two different pairings or pole piece groupings for opposite directions of rotation of the rotor. In other words, the auxiliary windings of each pair may be alternatively energized to have the same instantaneous polarity as the unshaded pole pieces on one side or the other thereof. With the coil connections shown (Fig. 9), a single-pole double-throw switch 19 may be used selectively to connect the windings for rotation of the rotor in one direction or the other or to stop the same. The motor is connected to a suitable source of alternating current through supply lines $L_1$—$L_2$ and a plug 20. Upon closure of the switch contact $S_1$ the motor is energized for rotation in one direction through a circuit $L_2$—$S_1$—$21$—$AW_1$—$22$—$AW_3$—$23$—$24$—$MW_2$—$25$—$MW_1$—$L_1$. In such case, the auxiliary windings $AW_1$ and $AW_3$ may be arranged to produce a magnetic flux of the same instantaneous polarity as the main windings $MW_1$ and $MW_2$ respectively although lagging behind the same in time phase due to the shading rings 18. In such case, the oppositely wound auxiliary windings $AW_2$ and $AW_4$ are arranged to produce a magnetic flux of the same instantaneous polarity as the main windings on the opposite sides thereof, namely, $MW_2$ and $MW_1$, respectively. Thus, upon closure of the switch contact $S_2$ the motor is energized for rotation in the opposite direction through a circuit $L_2$—$S_2$—$26$—$AW_2$—$27$—$AW_4$—$23$—$24$—$MW_2$—$25$—$MW_1$—$L_1$. The motor may be stopped at will by moving the switch 19 to its open-circuit position shown in Fig. 9.

In accordance with one of the improvements in construction herein contemplated the stator unit 11 preferably embodies an improved arrangement for holding the elements thereof together as a unitary structure. It has heretofore been common to secure the stator core laminations together by through bolts which also hold the end bells or end shields in place. In the present instance, however, the laminations are held against separation by the windings and more particularly by the shading rings 18 which encircle the pole piece projections. These windings and shading rings are in turn wedged tightly against accidental displacement by a series of wedges 30 (Fig. 3). These wedges may be made of stiff fibrous insulating material and are driven in place with their opposite edges lodged between the angularly disposed lateral faces of the pole pieces and windings or rings thereon (Fig. 2). A series of magnetic permeable steel bridges 31 press fitted between each of the adjacent pole pieces also aid in holding the wedges and coils in place. This magnetic bridge feature forms no part of the present invention but a reversible shaded pole electric motor of generally similar construction to that herein illustrated and embodying magnetic permeable bridges disposed between all of the adjacent pole pieces is described and claimed in my copending application Serial No. 171,629 filed October 29, 1937. Many of the structural improvements for motors herein described are applicable not only to reversible shaded pole motors but also to motors of other types. Motors constructed in accordance with the features of the present invention described above are such that a compact sturdy structure is had which may be readily handled as a unit during manufacture or subsequent partial disassembly of the motor.

The wedges 30 are also arranged to aid in completing the end connections between the various exciting windings. Thus, metal eyelets 32 (Fig. 3) are secured to the outer ends of the wedges and the terminal or end connection wires of the windings are soldered to the same. As a result, several terminals may be joined together at a common point by soldering them to one of the eyelets as indicated in Fig. 2. The interconnections for such a wiring arrangement as that shown in Fig. 9 and described above can thus be had with great facility. Upon reference to Fig. 3 it will be noted that laterally offset shoulders 33 are preferably formed on each of the wedges 30 so as to limit the endwise movement of the wedges. These shoulders engage the outer faces of the pole pieces and thus position the wedges with the eyelets 32 displaced laterally outward from the rotor a sufficient distance that the necessary soldering operations can be carried on without difficulty.

A pair of protective enclosing shields or end bells 34 and 35 (Fig. 1) is detachably secured to the opposite faces of the stator core 15 by through bolts 36. As will hereinafter appear, a number of associated motor parts are preferably mounted on these end bells and in addition, a mounting plate for the whole motor structure is preferably clamped between one of the end bells and the stator core. As a consequence, it is particularly desirable that such provision as that heretofore described be made for removing the end shields for inspection or repair of the associated parts attached thereto without disassembly of the stator core unit. The end bells 34 and 35 illustrated are preferably fashioned as stampings from sheet metal and are generally cup-shaped in contour in order to provide ample space for interiorly located bearings disposed therein.

A convenient means of mounting the motor as, for example, on the chassis of a radio set, is afforded by a mounting plate 37 (Figs. 1 and 5). For the sake of rigidity, this plate is preferably channel-shaped, the side walls 38 thereof closely embracing the sides of the stator core 15. A generally rectangular opening 39 in the plate 37 registers with the rotor recess in the stator while holes 40 therein are arranged to receive the through bolts 36. The plate 37 may thus be clamped between the front face of the stator core 15 and the front end bell 34. The mounting plate can then be fastened to any associated framework or the like by screws inserted in holes 41.

Rotational support is afforded the rotor 10 by a pair of annular self-alining bearing members 42 (Fig. 4) in which the rotor shaft 43 is journaled. These bearing members are provided with spherically-shaped outer end surfaces received within a complemental recess formed in the end bells 34 and 35 and sheet metal brackets 44. These brackets are generally U-shaped (Fig. 7) and are stuffed with felt or other absorbent material 45 impregnated with oil. The bearing members 42 are porous so that the lubricating oil from the felt passes through the same and provides an oil film on the surface of the rotor shaft 43. Sufficient clearance is provided between the bearings 42 so that the rotor 10 is permitted a limited endwise or axial movement, this axial movement being preferably utilized to actuate an associated clutch mechanism as is hereinafter described.

An improved form of combination clutch and brake mechanism is provided in the present motor by means of which the driven member of the clutch is automatically disengaged and positively stopped in response to deenergization of the motor. In the exemplary embodiment the combination clutch and brake mechanism includes a driving member 46 fast on the rotor shaft 43 (Fig. 4) and a cooperating driven member 47. Upon reference to Fig. 8, it will be seen that the driving member 46 is generally disk-shaped and is provided with a pair of laterally and axially extending fingers 46ª adapted to engage with a pair of complemental L-shaped fingers 47ª on the driven member 47. These clutch members may be economically fashioned as stampings from sheet metal. The driven member 47 is fast on a pinion 48 which is in turn loosely journaled on the rotor shaft 43. The cooperating clutch members are enclosed by a generally U-shaped sheet metal bracket 49 having flanges or feet 50 thereon (Fig. 6) which are secured to the front motor and bell 34.

In order to insure quiet operation of the clutch mechanism and motor a disk-shaped resilient metallic washer 46ᵇ is preferably disposed between the clutch members 46 and 47 (Fig. 4). This washer 46ᵇ is loosely carried by the shaft 43 and has a permanent set or bend about a transverse axis. With the washer 46ᵇ thus interposed between the clutch members, it exerts a light pressure tending to move them apart when they are engaged although it simply floats freely, exerting no pressure when the clutch members are not engaged. Consequently, any noise is eliminated which might otherwise result from chattering of the clutch members, especially in the event that the rotor movement is slightly irregular or oscillatory due to the effect of the alternating current.

In the operation of the clutch and brake mechanism herein shown, the clutch member 46 is moved to the right (as viewed in Fig. 4) out of engagement with the clutch member 47 by a corresponding axial movement of the rotor 10. The rotor is normally urged to such position by a spring biasing mechanism hereinafter described. As soon as the motor exciting windings are energized, however, the magnetic flux set up in the stator core pulls the rotor 10 from the full-line position shown in Fig. 4 to the dot-dash position indicated. This axial movement of the rotor and its shaft causes the clutch member 46 to be moved axially to the left into engagement with the clutch member 47 so that they are connected in driving relation. At the same time, the driven clutch member 47 is pulled slightly to the left out of engagement with the inner surface of the outer wall of the bracket 49. Upon subsequent deenergization of the motor the spring bias on the rotor shaft 43 causes the clutch member 46 to be automatically disengaged from the member 47. At the same time, the friction between the pinion 48 and shaft 43 causes the clutch member 47 to be moved to the right (as viewed in Fig. 4) a short distance during the corresponding axial movement of the rotor shaft so that the outer ends of the clutch fingers 47ª frictionally engage the inner surface of the bracket 49. This surface of the bracket thus forms a fixed abutment frictionally engaging the ends of these fingers so that a braking action is exerted on the clutch driven member 47 causing the same to be stopped immediately. Great nicety of control may thus be attained with the motor structure described since mere opening and closing of the switch 19 for the motor energizing windings causes the combined clutch and brake mechanism to be automatically actuated. In this operation, the clutch mechanism immediately disengages the load and stops the same as soon as the motor is deenergized, but nevertheless leaves the rotor 10 free to coast to a stop without impediment and without affecting the position of a driven instrumentality such as a radio tuning mechanism.

Suitable gearing for connecting the motor pinion 48 to a load may be incorporated directly in the motor structure. Thus, in the construction illustrated, a gear 51 (Fig. 4) meshing with the pinion 48 is journaled on a stub shaft 52 secured between the front end bell 34 and the downwardly extending end 53 of the bracket 49. A pinion 54 fast on the gear 51 in turn meshes with a second gear 55 press fitted on a knurled portion 56 of a power take-off shaft 57. The gear 51 which rotates at a relatively high speed is preferably made of Textolite or similar accoustically nonresonant material so that quiet operation will be insured. The shaft 57 is supported on the lower portion of the motor mounting plate 37 by a bushing 58 having a threaded inner end passing through a hole 59 in the plate and secured in position by a nut 60 and C-shaped locking washer 61 fitting in a complemental groove in the shaft.

Lubricant is supplied to the stub shaft 52 from a felt ring 62 surrounding the same and impregnated with oil. This felt ring is held in position by a small sheet metal bracket 63 secured to the lower end portion 53 of the larger bracket 49. Lubricant thus seeps from the felt ring 62 along the shaft 52, lubricating the pinion 54 and gear 51. Similarly, the pinion 48 on the rotor shaft 43 is lubricated by oil which flows along the surface of the shaft from the adjacent motor bearing 42. An effective system of lubrication is thus provided which will facilitate extended service of the motor without reoiling or attention from the user.

An improved form of switch mechanism has been provided which is adapted to be actuated by the motor in response to energization and deenergization thereof and which in addition serves to resiliently urge the rotor 10 out of its alined or operative position with respect to the stator core

15. Upon reference to Figs. 1 and 4, it will be seen that the switch mechanism shown includes a pair of resilient spring fingers 65 and 66 separated by suitable insulating spacers 67 and secured to the rear motor end bell 35 by screws 68. When mounted in this position, ready access may be had to the switch mechanism for making any selected wiring connections thereto or for inspecting and repairing the same. A pair of contact points 69—70 is carried by the fingers 65—66. In the switch shown, these contact points are normally open and the spring finger 66 bears against the outer end of the rotor shaft 43, thereby urging the rotor 10 to the right as viewed in Fig. 4, and in this way augmenting the action of the spring washer 46b. Upon energization of the motor exciting windings the rotor moves into alinement with the stator core, as described above, against the bias of the finger 66, thereby bending the latter and effecting a closure of the contact 69—70. In the case of a radio set installation the switch mechanism described may be utilized to control a muting circuit for the receiver. Such circuits are well-known in the art and consequently, need not be described in detail. In general, however, they serve to reduce the output volume of the receiver. Thus, when the motor is energized to turn the tuning mechanism of the radio set the muting circuit will be automatically completed by closure of the contacts 69—70 so that undesirable loud noises from the set will not be had during the tuning operation. Since the spring finger 66 bears against the rounded outer end of the motor shaft 43 a substantially single point contact is had therebetween, thus minimizing the frictional load on the rotor and facilitating quiet operation.

The motor herein disclosed also includes a thermal protective arrangement. This includes a thermally actuatable switch designated generally by the numeral 71 interposed in the supply line L₂ (Fig. 9). This switch is normally closed but upon being opened in response to abnormal heating of the motor, open-circuits the latter and thus effectually prevents further operation until the motor temperature has fallen to a safe value.

By this means, a potential fire hazard in the radio set in the event of a short-circuit in the motor is obviated. Upon reference to Figs. 7 and 10 it will be seen that the thermostatic switch 71 includes an elongated bimetallic blade 72 controlling a pair of contact points 73 and 74. The point 73 is mounted on the blade 72, while the point 74 is formed by the end of a rivet which also secures a terminal 75 in place. A second rivet 76 serves to hold the switch blade in position on a supporting plate 77. This supporting plate is made of Bakelite or similar thermal as well as electrical insulating material and extends across an elongated aperture 78 (Fig. 7) in the rear end bell 35. It will thus be seen that the inner face of the thermally sensitive bimetallic switch blade 72, exposed to heat radiated from the interior of the motor, is in effect thermally isolated from outside sources of heat. Consequently, inadvertent actuation of the switch will not be had due to the proximity of a hot body such as a radio vacuum tube when the motor is used in a radio set. The plate 77 of insulating material also forms a convenient base on which may be mounted the terminals 79 for the conductors 21 and 26 (Fig. 1).

Although a particular embodiment of the invention has been shown and described in some detail for purposes of illustration, there is no intention to thereby limit the invention to such embodiment but, on the other hand, the appended claims are intended to cover all modifications within the spirit and scope of the invention.

This application is a continuation in part of my copending application, Serial No. 133,531, filed March 29, 1937. This earlier filed copending application discloses, but does not claim a wedge construction for retaining the motor energizing windings and their end connections in position which is generally similar to that described and claimed herein.

I claim as my invention:

1. The combination in an electric motor of a stator having an energizing winding thereon, an inductively related rotor, means supporting said rotor for limited endwise movement as well as for rotational movement, means urging said rotor axially out of alinement with said stator, the magnetic attraction between said rotor and stator upon energization thereof serving to pull said rotor axially into alinement with said stator, a first clutch member loosely journaled on said rotor and having an outwardly and axially extending projection thereon, a second clutch member fast on said rotor and movable into and out of engagement with said projection as said rotor moves respectively into and out of alinement with said stator, and braking means including a fixed abutment engageable with said projection when said first clutch member is in its disengaged position for preventing overrunning thereof after disengagement, said first clutch member being shifted axially to engage said projection with said abutment by friction between said first clutch member and said axially movable rotor.

2. The combination in an electric motor of a stator having an energizing winding thereon, an inductively related rotor carried by a rotor shaft, means supporting said rotor and shaft for limited endwise movement as well as for rotational movement, means urging said rotor axially out of alinement with said stator, the magnetic attraction between said rotor and stator upon energization of said winding serving to pull said rotor axially into alinement with said stator, a pinion loosely journaled on said shaft and meshing with a driven gear, a first clutch member fashioned as a stamping from a portion of sheet metal and fast on said pinion, said stamping being provided with L-shaped integral radially extending ears thereon, a second clutch member fast on said shaft, said second clutch member being fashioned as a stamping from a portion of sheet metal and including a body portion with radially projecting complemental ears engageable with said first-named ears when said rotor is alined with said stator, and a U-shaped sheet metal enclosing bracket extending about said clutch members and presenting an inner face to the ends of said L-shaped ears, whereby outward movement of said rotor and shaft upon deenergization of said motor serves automatically to move said second clutch member out of engagement with said first clutch member and the frictional engagement of said pinion with said shaft causes said pinion and first clutch member to be moved outwardly until the ends of said L-shaped ears frictionally engage said inner face of said bracket to thereby prevent overrunning of said first clutch member.

3. The combination in an electric motor of a stator having an energizing winding thereon, an inductively related rotor carried by a rotor shaft, means supporting said rotor and shaft for limited endwise movement as well as for rotational movement, means urging said rotor axially out of alinement with said stator, the magnetic attraction between said rotor and stator upon energization of said winding serving to pull said rotor axially into alinement with said stator, a pinion loosely journaled on said shaft and meshing with a driven gear, a first clutch member fashioned as a stamping from a portion of sheet metal and fast on said pinion, said stamping being provided with integral radially extending ears thereon, and a second clutch member fast on said shaft, said second clutch member being fashioned as a stamping from a portion of sheet metal and including a body portion with radially projecting complemental ears engageable with said first-named ears when said rotor is alined with said stator.

4. In an electric motor of the character described the combination of a stator core having a rotor recess therein, an inductively related rotor in said recess, end shields extending across opposite ends of said core, a shaft for said rotor journaled in said end shields for limited axial movement as well as for rotational movement, one end of said shaft projecting beyond the adjacent one of said end shields, said stator core having an energizing winding thereon, the magnetic attraction between said stator and rotor being automatically effective upon energization of said winding to pull said rotor axially into alinement with said stator, a resilient finger fast on the exterior of said one end shield and bearing against said projecting end of said shaft to urge said rotor out of alinement with said stator, said finger being displaceable by said rotor shaft upon movement of said rotor in response to energization of said stator winding, means including a pair of electrical contacts actuated by said resilient finger for controlling an associated electric circuit, and a clutch mechanism operatively connected to said rotor and movable into and out of disengaged position in response to said endwise movement of said rotor.

5. For use in a radio control apparatus or the like, the combination of a motor adapted to drive a radio receiver tuning element and provided with relatively rotatable primary and secondary members, an enclosing casing for said members, means supporting said members for relative axial movement into and out of operative alinement, means including a movable resilient element mounted exteriorly of said casing for normally urging said members out of alinement, the magnetic attraction between said members upon energization being effective to pull the same into alinement and thereby move said element from its normal position, means responsive to such movement of said resilient element from normal position for controlling a muting circuit or the like of an associated radio receiver, a pair of disengageable clutch members arranged to connect said motor in operative relation with a radio receiver tuning element or the like, and means responsive to relative axial movement of said primary and secondary members for moving said clutch members into and out of engagement.

6. An electric motor comprising, in combination, a stator core including a stack of superposed laminations of magnetizable material defining a rotor recess, a rotor in said recess, means for holding said stack of laminations in assembled relation, end bells extending across opposite end faces of said stack, a supporting plate disposed between the abutting faces of one of said end bells and said stack and having an opening therein registering with said rotor recess, and common means detachably securing said end bells and mounting plate on said stack with a portion of said mounting plate extending laterally therefrom.

7. In an electric motor a unitary stator structure adapted to receive separable end bells without disassembly of the stator structure comprising, in combination, a stack of superposed laminations of magnetizable materal, said laminations being fashioned to define a rotor recess bordered by a plurality of salient pole projections, means including electrical windings surrounding said projections for holding said stack of laminations in assembled relation, and wedges lodged between adjacent projections and frictionally engaging said windings for wedging the same against displacement, said laminations having registering holes therein adapted to receive through bolts for holding end shields in place on opposite faces of the stack.

8. In an electric motor a unitary stator structure adapted to receive separable end bells without disassembly of the stator structure comprising, in combination, a stack of superposed laminations of magnetizable material, said laminations being fashioned to define a rotor recess, said laminations having registering slots therein extending outwardly from said recess, electrical windings disposed in said slots and surrounding portions of said stack of laminations for holding the same in assembled relation, and wedges lodged in said slots and frictionally engaging said windings for wedging the same against displacement, said laminations having registering holes therein adapted to receive through bolts for holding end shields in place in opposite faces of the stack.

9. In an electric motor a unitary stator structure adapted to receive separable end bells without disassembly of the stator structure comprising, in combination, a stack of superposed laminations of magnetizable material, said laminations being fashioned to define a rotor recess bordered by a plurality of salient pole projections, means including electrical windings surrounding said projections for holding said stack of laminations in assembled relation, wedges extending between adjacent projections for wedging said windings against displacement, and end shields detachably secured to opposite faces of said stack.

10. In an electric motor a stator member comprising a laminated core having a rotor recess therein bordered by a plurality of inwardly extending pole piece projections, said pole piece projections having parallel side faces and being generally angularly disposed with respect to each other, a plurality of interchangeable individual preformed coils surrounding said pole pieces with the inner ends of said pole pieces projecting beyond the inner faces of said coils, and means including a plurality of strips of insulating material interposed between adjacent pole pieces and having their lateral side edges wedged in the crevices defined between the inner faces of said coils and the projecting inner ends of said pole pieces to hold the wedges frictionally in position and thereby maintain the coils in position on said pole pieces.

11. In an electric motor a stator member comprising a laminated core having a rotor recess therein bordered by a plurality of inwardly extending pole piece projections, said pole piece projections having parallel side faces and being generally angularly disposed with respect to each other, a plurality of interchangeable individual preformed coils surrounding said pole pieces, means including a plurality of strips of insulating material interposed between adjacent pole pieces and bearing against the outer portions of said coils for maintaining the same in position on said pole pieces, and lateral projections on said strips engaging adjacent portions of said coils for limiting endwise displacement of said strips, said strips having apertures therein affording an insulated support for end connections between said coils.

12. In a two-pole alternating current motor a stator member comprising a generally rectangular laminated core having a rotor recess therein bordered by four inwardly extending pole piece projections arranged at intervals of substantially ninety degrees about the recess, said pole piece projections having parallel side faces and one opposed pair of said pole pieces being longer than the other pair, a plurality of interchangeable individual preformed coils surrounding said pole pieces, said coils being arranged in oppositely wound pairs on said longer pole pieces and with single coils on said shorter pole pieces, shading rings surrounding alternate ones of said pole pieces, and means including a plurality of strips of insulating material interposed between adjacent pole pieces and bearing against the outer portions of said coils for maintaining the same in position on said pole pieces by wedging the same in a direction axially of the pole pieces and against the portion by the core adjacent the bases of said pole pieces.

13. An electric motor comprising, in combination, a stator having an energizing winding thereon and a rotor recess therein, an inductively related rotor disposed in said recess, end shields secured to opposite ends of said stator, means including a thermally actuatable switch for de-energizing said winding in response to a predetermined rise in temperature thereof, one of said end shields having an aperture therein, and means including a thermal and electrical insulating member extending across said aperture for supporting said switch in a position to receive heat radiated from said winding while thermally isolating the same from sources of heat outside said motor and for supporting the supply terminals of said winding in electrically insulated relation to each other.

EDWARD L. BARRETT.